Figure 1:
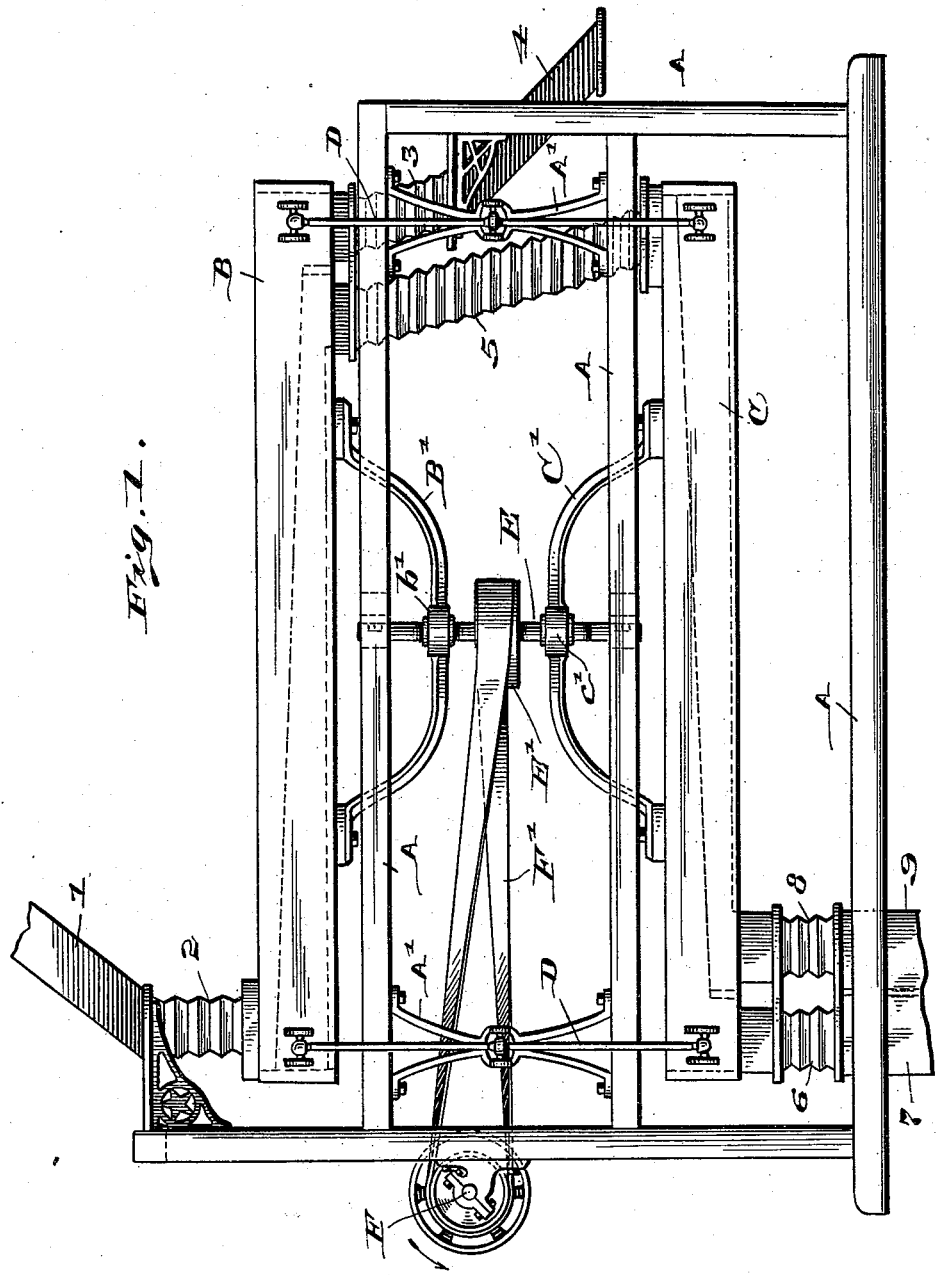

(No Model.) 2 Sheets—Sheet 1.

A. C. BRANTINGHAM.
SIFTING MACHINE.

No. 547,598. Patented Oct. 8, 1895.

WITNESSES:
H. B. Nealy.
J. A. Walsh.

INVENTOR
Allen C. Brantingham,
BY Chester Bradford,
ATTORNEY.

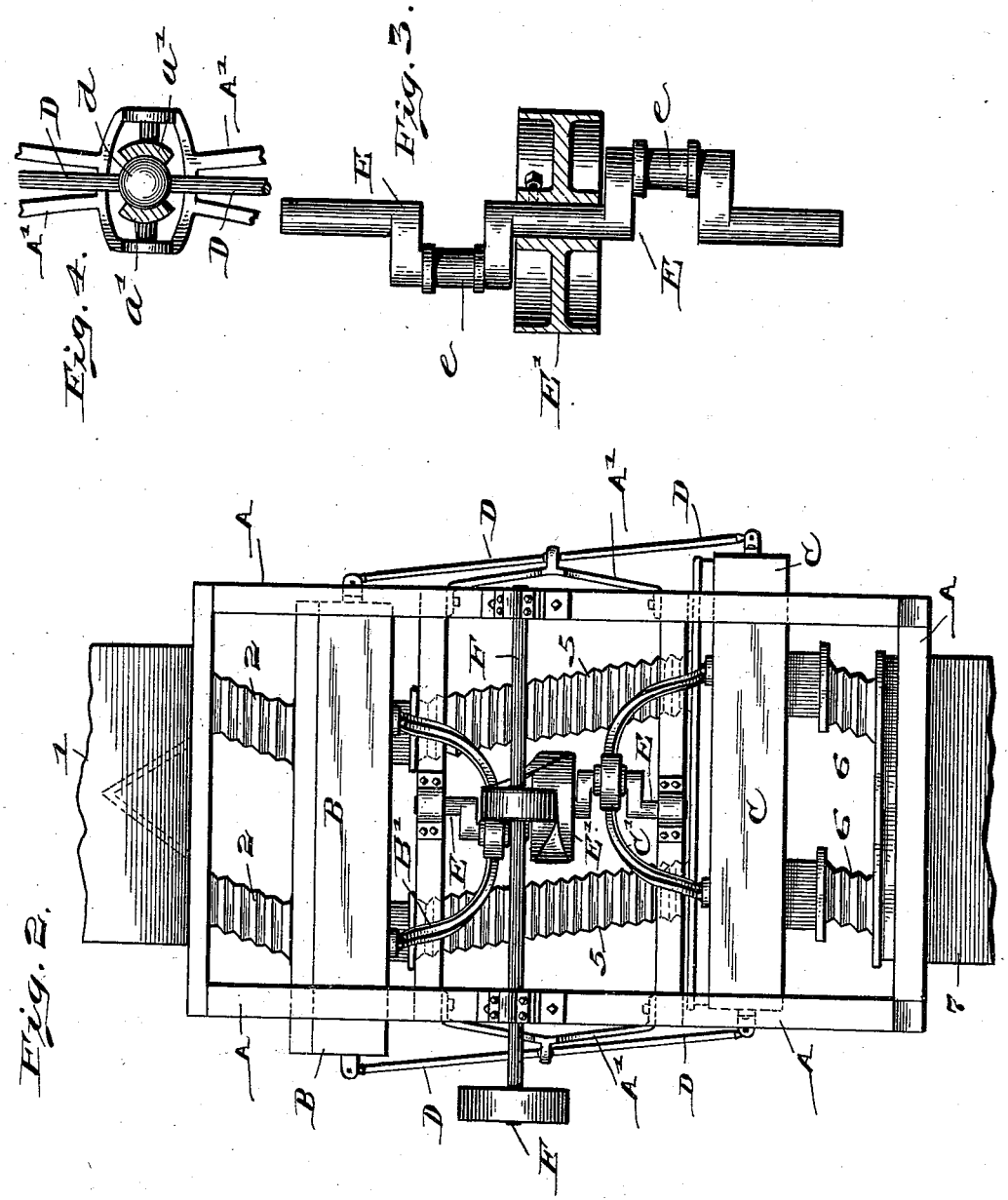

UNITED STATES PATENT OFFICE.

ALLEN C. BRANTINGHAM, OF TOLEDO, OHIO, ASSIGNOR TO THE NORDYKE & MARMON COMPANY, OF INDIANAPOLIS, INDIANA.

SIFTING-MACHINE.

SPECIFICATION forming part of Letters Patent No. 547,598, dated October 8, 1895.

Application filed March 7, 1895. Serial No. 540,840. (No model.)

*To all whom it may concern:*

Be it known that I, ALLEN C. BRANTINGHAM, a citizen of the United States, residing at Toledo, in the county of Lucas and State of Ohio, have invented certain new and useful Improvements in Sifting-Machines, of which the following is a specification.

The object of my present invention is to provide duplicate sieves in a sifting-machine so arranged and connected together that the vibration of one shall at all times be opposed to that of the other, the two structures being so united as that the shock and strain of the movements will be respectively equalized or counteracted by each other.

A sifting-machine embodying my said invention will be first fully described, and the novel features thereof then pointed out in the claims.

Referring to the accompanying drawings, which are made a part hereof and on which similar letters of reference indicate similar parts, Figure 1 is a side elevation of a sifting-machine embodying my present invention; Fig. 2, an end elevation of the same; Fig. 3, a detail view of the crank and pulley by which the sieves are operated, and Fig. 4, a detail view of the ball-and-socket connection for the uniting-rods.

In said drawings the portions marked A represent the framework of my improved machine; B and C, the two sieve structures; D, the rods which unite them; E, the shaft whereby motion is imparted thereto, and F the driving-shaft.

The frame A is of suitable size and shape for the purpose and is much lighter in construction than would otherwise be required to withstand the vibrations owing to the counteracting forces, as stated. Brackets A' are secured in said frame, which support the rods D and through them the sieves, as will be presently more fully described.

The sieve structures B and C are supported mainly by the rods D, as shown. The dotted lines in Fig. 1 indicate the sieve and conveying surfaces. These sieve structures are provided with the spider-brackets B' and C', through which motion is imparted thereto from the shaft E, as will be presently more fully described. The rods D are supported on the brackets A' by means of ball-and-socket or universal joint bearings $a'$ and $d'$, as shown most plainly in Fig. 4, and have corresponding ball-and-socket or universal joint bearings where they are connected to the sieve structures. The central ball or connection $d$ being fixedly held by means of the supporting-brackets, the ends manifestly must move uniformly and oppositely to each other. Thus while one sieve structure is moving in one direction the other sieve structure must be moving in exactly the opposite direction, and the jar or momentum is equalized or taken up by such reverse movements, one serving to counteract or neutralize the other, and thus but little shock or strain is borne by the framework, which enables the use of a much lighter structure, as a whole, than if such momentum were received wholly by the supporting-frame.

The shaft E is mounted at the ends in bearings in or upon the frame A and in its preferable form has a central pulley E', with a crank $e$ upon each side thereof, between the pulley and the end bearings, where it is supported by the frame A. These cranks $e$ engage with bearings $b'$ $c'$ in the spider-brackets B' C', which latter, as before stated, are rigidly attached to the sieve structures B and C, and thus motion is imparted to said sieve structures from said shaft. The shaft is driven by the belt F', running from a pulley on the driving-shaft F. The stock in its course through this machine enters first from a spout 1, and passes thence through flexible tubes 2 to the upper sieve structure B. The coarser material passes over the upper sieve therein, and passes out through the flexible tube 3 and discharge-spout 4 to the outside of the machine. The finer material passes down the bottom of the sieve structure B, and discharges through the flexible tubes 5 into the sieve structure C, where the coarser material again passes over the sieve therein and out through the flexible tubes 6 and discharge-pipe 7, while the finer falls through said sieve and, passing down the floor of said sieve structure, passes off through the flexible tubes 8 and discharge-spouts 9. The character of these various discharges is of course governed by fineness and coarseness of the sieves used in the sieve structures.

The positions of these sieves and sieve structure bottoms, as before stated, are indicated by dotted lines in Fig. 1.

Having thus fully described my said invention, what I claim as new, and desire to secure by Letters Patent, is—

1. The combination, in a sifting machine, of the two sieve-structures located one above the other, a frame-work extending between said two sieve structures, bearings in said frame-work centrally located between said two sieve structures, a double crank-shaft mounted in said bearings, spider-like brackets mounted on the cranks of said crank-shaft and united to the said sieve structures, whereby both sieve structures are operated by said crank-shaft, substantially as shown and described.

2. The combination, in a sifting machine, of the two sieve structures B and C, the supporting rods D therefor connected thereto by ball-and-socket bearings, and themselves centrally supported by similar bearings in brackets A' on the frame-work, a double crank-shaft E centrally located between the sieve structures, and spider brackets connected to said structures and driven by said crank-shaft, substantially as shown and described.

3. The combination, in a sifting machine, of the frame-work, the two sieve structures, rods connecting said sieve structures, central bearings carried by said frame-work supporting said rods, a double crank-shaft mounted in bearings in said frame-work and located centrally between said two sieve structures, connections between the cranks of said crank-shaft and said sieve structures whereby they are simultaneously driven in opposite directions, and flexible tubes connecting said sieve structures to each other and to suitable receiving and discharging spouts, said several parts being arranged and operating substantially as shown and described.

In witness whereof I have hereunto set my hand and seal, at Toledo, Ohio, this 2d day of March, A. D. 1895.

ALLEN C. BRANTINGHAM. [L. S.]

Witnesses:
M. W. PLATT,
GEO. J. RUDD.